United States Patent [19]

Murray

[11] Patent Number: 4,486,574

[45] Date of Patent: Dec. 4, 1984

[54] POLYMERS OF METHYL ETHENYL BENZENE

[75] Inventor: James G. Murray, East Brunswick, N.J.

[73] Assignee: Mobil Oil Corporation, New York, N.Y.

[21] Appl. No.: 412,418

[22] Filed: Aug. 27, 1982

Related U.S. Application Data

[63] Continuation of Ser. No. 209,095, Nov. 21, 1980, abandoned, which is a continuation of Ser. No. 032,075, Apr. 23, 1979, abandoned, which is a continuation-in-part of Ser. No. 870,781, Jan. 19, 1978, abandoned.

[51] Int. Cl.³ .............................. C08F 8/22; C08F 8/36
[52] U.S. Cl. ................................. 525/333.4; 525/344; 525/357
[58] Field of Search .................. 525/333.4, 333.5, 344, 525/357

[56] References Cited

U.S. PATENT DOCUMENTS

| | | | |
|---|---|---|---|
| 2,763,702 | 9/1956 | Amos | 585/321 |
| 2,809,959 | 10/1957 | Roth | 525/344 |
| 2,809,960 | 10/1957 | Roth | 525/344 |
| 2,813,087 | 11/1957 | Roth | 525/344 |
| 3,008,937 | 11/1961 | Ruffing | 526/347 X |
| 3,009,906 | 11/1961 | Eichhorn | 526/346 X |
| 3,033,834 | 5/1962 | Roth | 525/344 |
| 3,062,903 | 11/1962 | Odioso | 585/439 |
| 4,074,032 | 2/1978 | Naarmann | 525/357 |
| 4,086,287 | 4/1978 | Kaeding | 585/466 |
| 4,143,221 | 3/1979 | Naarmann | 525/357 |

*Primary Examiner*—Christopher A. Henderson
*Attorney, Agent, or Firm*—Alexander J. McKillop; Michael G. Gilman; Edward J. Trojnar

[57] ABSTRACT

Polymers of methyl styrene produced from an isomer mixture having a high content of the para-isomer are halogenated, sulfonated or subjected to other substitution reactions.

2 Claims, No Drawings

POLYMERS OF METHYL ETHENYL BENZENE

CROSS REFERENCE TO RELATED APPLICATIONS

This application is a continuation of Ser. No. 209,095 filed Nov. 21, 1980, abandoned; which is a continuation of Ser. No. 032,075, filed Apr. 23, 1979, abandoned; which is a continuation-in-part of Ser. No. 870,781, filed Jan. 19, 1978, abandoned.

U.S. patent application Ser. No. 706,981 filed July 19, 1976, now U.S. Pat. No. 4,086,287, Ser. No. 801,177, filed May 27, 1977 and now abandoned, and Ser. No. 925,585, filed July 17, 1978, now U.S. Pat. No. 4,143,084, all in the name of W. W. Kaeding and L. B. Young are all directed to related subject matter.

This invention relates to polymers derived from a mixture of isomeric methyl ethenyl benzenes and, more particularly, to such polymers having certain substituent groups.

THE PRIOR ART

Styrene has been used for a long period of time in the manufacture of polymers and polystyrene has attained a large market for many purposes. Alkylated styrenes such as alpha-methylstyrene have also been of interest for certain purposes.

The nuclear alkyl substituted styrenes have also been used in various applications. The monomer which has been principally used is known as vinyltoluene. This is a mixture which consists mainly of meta- and para-methyl styrenes (vinyl toluenes) produced by the catalytic dehydrogenation of a mixture of the corresponding m- and p-ethyltoluenes. The ethyltoluene mixture is itself obtained by the fractional distillation of a mixture of the o-, m- and p-ethyltoluenes. The ratio of the m- and p-isomers in the monomer mixture is approximately 65:35 (m:p). A convenient summary of the preparation and properties of the monomer mixture and of polymers produced from it is given in "Styrene: Its Polymers, Copolymers and Derivatives": Ed. R. H. Boundy, R. F. Boyer, ACS Monograph Series, 1952, Hafner Publishing Company, pages 1232 to 1245.

THE INVENTION

We have now found that polymers with advantageous properties can be prepared from a mixture of isomeric methyl ethenylbenzenes having a particular isomeric distribution.

The polymerizable isomeric mixture consists essentially of the m- and p-isomers of methyl ethenyl benzene. The mixture is substantially devoid of the o-isomer; when the o-isomer is present, the amount of it is less than 0.1% based on the total weight of the isomer mixture.

The ratio of the isomers in the mixture is as follows:

| Isomer | Wt. Percent |
| --- | --- |
| 1-methyl-2-ethenyl benzene | Less than 0.1, preferably less than 0.05. |
| 1-methyl-3-ethenyl benzene | Less than 10, preferably less than 5. |
| 1-methyl-4-ethenyl benzene | 90–99 preferably at least 95. |

Generally, the proportion of the p-isomer (1-methyl-4-ethenyl benzene) will be at least 95 weight percent with the m-isomer (1-methyl-3-ethenyl benzene) constituting less than 5 weight percent of the mixture. Particularly preferred mixtures contain 97 to 99 weight percent of the p-isomer and 1 to 3 weight percent of the m-isomer.

The isomer mixture may contain impurities and adventitious materials in addition to the methyl ethenyl benzenes. Generally, these other materials will not constitute more than 1 percent by weight of the total mixture. These other materials derive essentially from the process used to make the methyl ethenyl benzenes.

A typical isomer mixture has the following analysis, by weight, determined by gas chromatography:

| | Wt. percent | |
| --- | --- | --- |
| Total vinyl benzenes | | 99.41 |
| Residue: | | |
| Ethyl toluene | 0.10 | |
| Mesitylene etc. | 0.15 | |
| Non-vinylic | 0.34 | |
| higher boilers | 0.59 | 0.59 |
| | | 100.00 |
| Vinyl benzenes: | | |
| 1-methyl-2-ethenyl benzene | 0.05 | |
| 1-methyl-3-ethenyl benzene | 2.6 | |
| 1-methyl-4-ethenyl benzene | 97.4 | |

The mixture of the isomeric methyl ethenyl benzenes may be obtained by the catalytic dehydrogenation of a mixture of the corresponding ethyl toluenes, which in turn may be obtained by the selective alkylation process disclosed and claimed in co-pending U.S. patent application Ser. Nos. 709,981, filed July 19, 1976 and 801,177, filed May 27, 1977 by Warren W. Kaeding and Lewis B. Young, the disclosures of which are incorporated herein by reference.

In its application to the production of the methyl ethenyl benzenes, the method disclosed in the Kaeding et al application essentially involves the alkylation of toluene with ethylene in the presence of certain crystalline aluminosilicate zeolite catalysts. The catalyst has a silica to alumina ratio of at least 12 and a constraint index (defined in the application) within the range of 1 to 12. The process produces an extremely high proportion of the 1-methyl-4-ethyl benzene isomer, with only a minor proportion of the 1-methyl-3-ethyl benzene isomer and negligible amounts of the 1-methyl-2-ethyl benzene isomer. The almost complete absence of the 1-methyl-2-ethyl isomer is highly advantageous because this isomer tends to produce undesired by-products during the dehydrogenation step (indanes and indenes which adversely affect the properties of the resultant polymers and which cannot be easily separated from the methyl ethenyl benzenes).

The mixture of isomeric methyl ethyl benzenes may be subjected to distillation prior to the dehydrogenation step in order to separate out various by-products and after the dehydrogenation has been completed, a further distillation may be carried out to separate the methyl ethenyl benzenes from their saturated precursors.

Since the proportion of the 1-methyl-4-ethenyl benzene in the mixture is so high, usually at least 95 percent by weight, the mixture can be regarded essentially as the para (1,4-) isomer. For convenience in this specification, therefore, the mixture may be referred to as "the para monomer" and the polymer produced by the polymerization of this mixture in the absence of other monomers as "the homopolymer" in order to distinguish it from polymers produced by polymerizing the mixture with other, copolymerizable monomers. It should, however, be remembered that "the homopolymer" is, in fact, a copolymer of the isomeric monomers.

The mixture of the isomers may be polymerized by itself to produce "the homopolymer" or with other copolymerizable monomers to produce copolymers. In general, the polymerization conditions appropriate to styrene will also be useful with the methyl ethenyl benzene mixture, whether polymerized by itself or with other monomers. Thus, polymerization may be effected under bulk conditions or in solution, suspension or emulsion techniques comparable to those used for styrene polymerization. The polymerization catalysts may be of the free radical, anionic or cationic types. Suitable free radical initiators include di-tertiary butyl peroxide, azobis (isobutyronitrile), di-benzoyl peroxide, tertiary butyl perbenzoate, di-cumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula RMy where R is organo, mono- or polyvalent and may be alkyl, alkenyl, aryl, aralkyl, and alkaryl, and may contain from 1 to about 50 carbon atoms; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type may be used. Branched chain polymers may be obtained by using multifunctional initiators, for example 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7 in a valence state lower than its maximum in combination with an organometallic compound of Group 2 or 3. Among the reducible transitional metal compounds suitable for preparing such catalysts are the heavy metal inorganic compounds such as halide, oxyhalides, complex halides, hydroxides, and organic compounds such as alcoholates, acetates, benzoates, and acetyl acetonates, of the requisite metals. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium, tetrabromide, zirconium tetrachloride, vanadium tetrachloride, and zirconium acetylacetonate.

The reduction may be affected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940.

The other component of the catalyst system is at least one organometallic compound of a metal of Groups 2 or 3. These compounds will have at least one hydrocarbon radical, i.e., alkyl, cycloalky, aralkyl, alkaryl, or aryl, attached to the metal through a carbon atom. The other substituents in the organometallic compound can be hydrocarbon radical,s halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more organometallic compounds can be used.

The catalyst can be formed by methods well known in the art. Thus, for example, it can be made by charging the components separately to the polymerization zone or they may be combined immediately prior to entry into the zone.

As previously mentioned, the polymerization may be carried out in bulk, in solution, in suspension or in emulsion. Solution polymerization will generally employ inert hydrocarbon solvents such as toluene, benzene or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

Polymerization may also be carried out thermally.

The polymerization conditions will generally be similar to those used for styrene. Thus temperatures will generally be in the range of 0° to 200° C., preferably 50° to 150° C., with a range of about −80° 1 C. to +30° C. being most appropriate for cationic polymerization.

The polymers produced by polymerizing the mixture by itself have unexpected and advantageous properties. They have a higher glass transition temperature than polystyrene (which means that the polymer retains its solid state properties at higher temperatures), a higher Vicat softening point thatn polystyrene and a lower density than polystyrene. They are also cross-linkable either by radiation e.g. electron beam irradiation or gamma ray, or by chemical cross-linking agents such as dicumyl peroxide and other peroxidic compounds (this is in surprising contrast to the behavior of polymers of styrene which depolymerize when attempts are made to cross-link them chemically with peroxides: the polymers of the present invention cross-link to give insoluble, infusible products). Although the polymers of the present invention have a greater affinity for hydrocarbon solvents than polystyrene (as evidenced by a higher pentane absorption) this can be reduced by polymerizing the mixture with a barrier type monomer such as acrylonitrile. The greater affinity for hydrocarbons is, however, advantageous in the production of expendable beads (for example, similar to those described in British Pat. No. 1,049,144) because the hydrocarbon blowing agents will be retained to a greater degree by the polymer.

The homopolymers can be readily sulfonated and subjected to other electrophilic substitution reactions such as chlorination and bromination. These reactions occur more readily than with polystyrene. The sulfonation can be continued to a degree such that the resultant sulfonated material is water soluble. Control of the degree of sulfonation can therefore be used to regulate the solubility characteristics of the material. The sulfonate groups may, of course, be neutralized by alkalies such as ammonia, sodium hydroxide, potassium hydroxide and the like to give a neutral material. Sulfonating agents such as sulphonyl chloride, chlorosulfonic acid and sulfur trioxide or sulfuric acid (oleum) may be used to effect the sulfonation. Nuclear halogenation may be carried out by contact with the appropriate halogen, preferably (but not necessarily) in the presence of a suitable catalyst such as a Lewis acid for example, ferric chloride or ferric bromide. The halogenated polymers, especially the brominated ones, are non-flammable and self-extinguishing materials. Halogenation of the methyl side chains can be carried out by the use of a halogenating agent under free-radical conditions, for example, in the presence of a peroxide or under light or ultra-violet radiation. Organo-metallic groups can be inserted by reaction of organo-metallic halides such as tin trimethyl chloride boron dimethyl chloride or lead trimethyl chloride in the presence of a Friedel-Crafts catalyst. The resulting materials may form catalysts or radiation resistant polymers.

The substituted polymers produced in this way are notable for possessing the same advantageous properties as the unsubstituted materials from which they are made, notably, a higher glass transition temperature and higher softening point. In addition, they have a greater thermal stability and faster cycle times for injection molding than polystyrene.

Control of the degree of substitution affects the properties of the final polymer. For example, as the degree of sulfonation increases the products tend to be more water-soluble. Increasing the degree of halogenation e.g. bromination, tends to render the products more fire-retardant. Thus, the manner and extent of the substitution enables products having new and advantageous properties to be prepared.

The higher glass transition temperature $T_G$ of the polymers, as compared to polystyrene, is a significant advantage. In general, polystyrene has a glass transition temperature of 100°–103° C. as measured by Differential Scanning Calorimeter (DSC) by the method described below. The polymers of the present invention, however generally have a glass transition temperature above 105° C., usually above 110° C. The exact temperature has been found to depend upon the content of the p-isomer in the monomer mixture, increasing with increasing p-isomer content, as shown in Table 1 below:

TABLE 1

| Content of 1-methyl-4-ethenyl benzene, wt. percent | $T_G$ (by DSC) °C., ± 1° C. |
| --- | --- |
| 99.7 | 113 |
| 97.0 | 111 |
| 95.5 | 110 |
| 89.3 | 106 |
| 76.2 | 100 |

By comparison, the polymer of "vinyl toluene" (which contains about 34% of the p-isomer) is only about 88° C.

The DSC method used to determine the glass transition temperature is as follows

Sample Preparation

A 500 m.g. sample is weighed in tared pan and transferred to 1¼" diameter mold in a Buehler Press and heated to approximately 190° C. The heat is removed and pressure applied to form a disk in the cavity and the disk is cooled. A sample specimen is punched from disk with a No. 7 belt punch and encapsulated in standard sample pan. The sample will weigh 15 to 20 mg.

Analysis

The encapsulated sample is placed in the Differential Scanning Calorimeter Sample Holder. Nitrogen is supplied to the calorimeter at 20 p.s.i. gauge to maintain an inert atmosphere around the sample during the test. The sample is heated at 20° C./min. to a temperature 20° C. above the glass transition temperature. Cooling at 20° C./min. is then permitted to a temperature approximately 80° C. below the observed glass transition. After the sample has equilibrated for 2 min., it is heated at 20° C./min. and the thermogram recorded. Convenient recorder settings are 40 mm./min. chart speed (corresponding to 12.7° C./min) with full scale deflection of 1 millicalorie/second.

The glass transition is the intersection of the baseline and the sloping change in heat capacity of the sample as the temperature increases.

The polymers are also notable for a higher Vicat softening temperature than polystyrene. Vicat softening temperature is measured by ASTM method D-1525. It, also, has been found to vary with the content of p-isomer in the monomer mixture, as shown below in Table 2:

TABLE 2

| Content of 1-methyl-4-ethenyl benzene, wt. percent | Vicat °C., ± 1° C. |
| --- | --- |
| 99.7 | 118 |
| 97.0 | 119 |
| 95.5 | 114 |
| 89.3 | 108 |

By comparison, styrene has a Vicat of about 107° to 108° C. and the polymer of "vinyl toluene" a Vicat of only 97° C. Thus, the present homopolymers are characterized by a Vicat temperature of at least 103° C., generally at least 110° or 112° C.

The polymers will generally have a molecular weight corresponding to intrinsic viscosities of 0.1 to 10 (toluene/30° C.). This will generally correspond to molecular weights of at least 30,000, with most molecular weights (Mv-viscosity average) being about 250,000 to 275,000 for commercial materials. The glass transition temperatures for very low molecular weight materials (below 50,000) may be lower than those indicated and therefore not suited for uses where solid state properties are desired. The melt indices will normally be in the range 2.0 to 3.0, generally 2.0 to 2.5. Relative densities of the polymers are comparable to those of styrene, being just above 1.0, generally about 1.01. Good optical properties as indicated by transmittances of at least 88% are typical of the polymers. The pentane uptake is generally about 40%, as compared to about 1–2% for polystyrene, thereby indicating a greater affinity for hydrocarbons.

Both homopolymers and copolymers of the mixture may be subjected to the substitution reaction. A particularly preferred class of copolymers for this purpose is the cross-linked type produced by the polymerization of the monomer mixture with a cross-linking monomer such as divinyl benzene. Other copolymers e.g. high-impact copolymers, copolymers with other aromatic monomers such as styrene, alpha-methyl styrene and so forth are all suitable for this purpose.

The following Examples are given in order that the invention may be more fully understood. Proportions and percentages are given by weight. The mixture of isomeric methyl ethenyl benzenes used in all the Examples was the same as that in Example 1 below.

EXAMPLE 1

Preparation of polymer from mixture of methyl-ethenyl benzene isomers

The mixture of methyl ethenyl benzene isomers used had the following composition (weight percent):

| | |
|---|---|
| Methyl ethenyl benzenes | 99.43 |
| Ethyltoluene | 0.53 |
| Xylenes, cumenes, mesitylenes | 0.01 |
| High boiling materials | 0.03 |
| Methyl ethenyl benzenes: | |
| 1-methyl-2-ethenyl benzene | —(1) |
| 1-methyl-3-ethenyl benzene | 3.0 |
| 1-methyl-4-ethenyl benzene | 97.0 |

Note:
(1)Less than 0.05%.

The mixture (120 g.) was dissolved in 46.75 g toluene and 0.168 g. azobis (isobutyronitrile) and poured into a dry bottle which was then closed by a coupling/ball valve assembly. Dry nitrogen was then bubbled through the mixture in the bottle for 10 minutes by means of a needle inserted through the septum and the open ball valve. The nitrogen exited through a short needle piercing the septum on top of the ball valve. The two needles were then removed, the ball valve closed and the bottle placed in an oil bath at 60° C. for 96 hours and at 90° C. for 24 hours.

The polymerized mixture was removed from the bottle by dissolving it in additional toluene at 90° C. The volume of the final solution was about 400 ml. The polymer was then precipitated by pouring the solution into about 1000–1500 ml methanol in a 4 liter blender (Waring Blender), adjusting the stirring speed to shred the polymer. The liquid was decanted and the polymer washed once with methanol in the blender. The solid polymer was filtered off and dried in a vacuum oven at 100° C. under vacuum for 48 hours.

The properties of the polymer were as follows:

| | |
|---|---|
| Molecular wt ($M_v$-viscos. Ave) | $269 \times 10^{-3}$ |
| ($M_n$-number Ave) | $158 \times 10^{-3}$ |
| $T_G$, °C. | 111 |
| Vicat, °C. | 119 |
| Deflection temp. °C. | 98 |
| Melt Index (Cond G) | 2.1 |
| Density g/cc | 1.008 |
| Break strength, psi | 6065 |
| Elongation, % | 3 |
| Tensile Modulus: | |
| Rheovibron, psi $\times 10^{-3}$ | 331 |
| Instron, psi $\times 10^{-3}$ | 338 |
| Impact strength, ft/lb-in | 0.20 |
| Haze | 4.4 |
| Transmittance, % | 89.7 |
| Pentane uptake | 41.0 |

EXAMPLES 1A, 1B, 1C

Polymers prepared in the same way as in Example 1 from similar monomer mixtures containing different proportions of the p-isomer (1-methyl-4-ethenyl benzene) had the following properties:

| Example | 1A | 1B | 1C |
|---|---|---|---|
| p-isomer content, % | 89.3 | 95.5 | 99.7 |
| Molecular wt ($M_v \times 10^{-3}$) | 271 | 278 | 269 |
| ($M_n \times 10^{-3}$) | — | 168 | 177 |
| $T_G$, °C. | 106 | 110 | 113 |
| Vicat, °C. | 108 | 114 | 118 |
| Deflection temp. °C. | 93 | 108 | 104 |
| Melt Index, (Cond G) | 3.0 | 2.4 | 2.3 |
| Density g/cc | 1.014 | 1.011 | 1.008 |
| Break strength, psi | 6010 | 5330 | 5170 |
| Elongation, % | 1.4 | 8 | 3 |
| Tensile Modulus | | | |
| Rheovibron, psi $\times 10^{-3}$ | 363 | 325 | 355 |
| Instron, psi $\times 10^{-3}$ | 309 | 301 | 332 |
| Impact Strength, ft/lb-in | 0.28 | 0.13 | 0.21 |
| Haze | 5.0 | 4.2 | 5.2 |
| Transmittance, % | 88.3 | 88.7 | 88.7 |
| Pentane uptake | 40.0 | 40.0 | 40.0 |

EXAMPLE 2

Preparation of copolymers with styrene

A mixture of 6.00 g, the monomer mixture of Example 1, 18.00 g styrene monomer, 10.30 g of toluene, and 0.0336 g azoisobutyronitrile initiator (DuPont "Vazo 64") was heated in a nitrogen atmosphere (nitrogen bubbled through for 10 minutes) at 60° C. for 119 hours, and then at 90° C. for 24 hours. The polymer was removed from the tube with the aid of more toluene, and precipitated by pouring the toluene solution into an excess of methanol in a blender. The polymer was dried in a vacuum oven at 80°–110° and 30 inches vacuum.

The reaction was repeated with 12 g. each of the monomer mixture, 18 g of the mixture and 6 g. of styrene and also with 24 g of styrene and of the monomer mixture to produce a range of samples having varying comonomer ratios.

The samples were compression molded and tested for tensile modulus on a Rheoribron machine. The results were as follows:

| Polymer No. | 2A | 2B | 2C | 2D | 2E |
|---|---|---|---|---|---|
| MEB monomer, wt. % | 0 | 25 | 50 | 75 | 100 |
| Styrene, wt. % | 100 | 75 | 50 | 25 | 0 |
| Modulus, psi $\times 10^{-3}$ | 332 | 382 | 329 | 356 | 331 |

| Polymer No. | 2A | 2B | 2C | 2D | 2E |
|---|---|---|---|---|---|
| Pentane uptake, percent | 1.0 | 1.5 | 23 | 30.5 | 41 |

The copolymer with 75% styrene has a notably high tensile modulus.

EXAMPLE 3

Sulfonation of the polymer

The polymer of Example 1 was dissolved in toluene and sulfonated at ambient temperature with chlorosulfonic acid in varying amounts. The sulfonation products were neutralized with sodium hydroxide or ammonia and the solvent removed.

The properties of the products were as follows:

| Expt. | Moles ClSo$_3$H/ Mole Monomer | Conditions | Neutralization | Properties |
|---|---|---|---|---|
| 3A | 0.46 | 25°/30 min | NaOH | water soluble Insol ChCl$_3$, Toluene, hexane |
| 3B | 0.20 | 25°/2 hr | NH$_3$ | water insoluble methanol soluble toluene insoluble |
| 3C | 0.10 | 25°/2 hr | NH$_3$ | Insoluble water hexane, swollen in toluene |

The products of Experiments 3B and 3C could be pressed into high softening point films. The glass transition temperature of the product of Experiment 3B was 140° C. and that of Experiment 3C was 113° C.

EXAMPLE 4

Preparation of a brominated polymer

Bromine (13.5 g dissolved in 50 ml of methylene dichloride was added dropwise to a solution of 10 g of the polymer of Example 1 dissolved in 100 ml of methylene dichloride containing 0.2 g of FeBr$_3$ during 30 minutes with stirring in an ice bath. Stirring was continued for 30 minutes and the mixture was then allowed to warm to room temperature with stirring overnight. The resulting solution was washed with water, potassium carbonate solution and the polymer precipitated by addition to methanol.

After drying there was isolated a product with the analysis:

| C | N | Br |
|---|---|---|
| 56.62 | 4.89% | 38.74% |

The product was dissolved in toluene and treated with a solution of potassium-t-amyl oxide to remove small amounts of reactive bromine. The resulting product was thermally stable and could be pressed into films which were self extinguishing and did not support combustion.

EXAMPLE 5

Preparation of a chlorinated polymer

Chlorine was bubbled into a solution of 10.0 g of the polymer of Example 1 in 100 ml of methylene dichloride containing 0.2 g of FeCl$_3$ at room temperature over 4 hours. The resulting solution was washed with 10% K$_2$CO$_3$ solution and water and the polymer isolated by precipitation in methanol.

Analysis of the polymer after drying showed:

| % C | % N | % Cl |
|---|---|---|
| 75.57 | 6.59 | 17.89 |

To remove traces of reactive halogen, the polymer was dissolved in toluene and treated with potassium-t-amyloxide. The treated polymer could be molded into high softening temperature films.

I claim:

1. A moldable, toluene soluble polymer produced by the chlorination or bromination of the polymerization product, having a viscosity average molecular weight of at least 250,000, of a polymerizable monomer mixture in which the sole monomers are isomers of methyl ethenyl benzene, in the following proportions by weight:

| 1-methyl-2-ethenyl benzene | 0 to 0.1 percent |
|---|---|
| 1-methyl-3-ethenyl benzene | 1 to 10 percent |
| 1 methyl-4-ethenyl benzene | at least 90 percent | said moldable polymer having substituent chloro or bromo groups.

2. The polymer of claim 1 in which the isomers are present in the mixture in the following proportions by weight:

| 1-methyl-2-ethenyl benzene | 0 to 0.05%. |
|---|---|
| 1-methyl-3-ethenyl benzene | 1 to 5% |
| 1-methyl-2-ethenyl benzene | at least 95%. |

* * * * *

UNITED STATES PATENT AND TRADEMARK OFFICE
CERTIFICATE OF CORRECTION

PATENT NO. : 4,486,574
DATED : December 4, 1984
INVENTOR(S) : JAMES G. MURRAY

It is certified that error appears in the above-identified patent and that said Letters Patent is hereby corrected as shown below:

| | |
|---|---|
| Column 3, line 61: | after "titanium" and before "tetrabromide" delete the ",". |
| Column 4, line 50: | "80° 1C." should be --80°C.--. |
| Column 8, line 1: | "$10^{-3}$" should be --$10^3$--. |
| Column 8, line 2: | "$10^{-3}$" should be --$10^3$--. |
| Column 8, line 27: | "$10^{-3}$" should be --$10^3$--. |
| Column 8, line 28: | "$10^{-3}$" should be --$10^3$--. |
| Column 10, line 1: | "N" should be --H--. |
| Column 10, line 23: | "%N" should be --%H--. |
| Column 10, line 53: | "1-methyl-2-ethenyl benzene" should be --1-methyl-4-ethenyl benzene--. |

Signed and Sealed this

Twenty-fifth Day of June 1985

[SEAL]

Attest:

DONALD J. QUIGG

Attesting Officer     Acting Commissioner of Patents and Trademarks